US012726694B2

(12) United States Patent
Kitai et al.

(10) Patent No.: US 12,726,694 B2
(45) Date of Patent: Sep. 1, 2026

(54) IMAGE CAPTURING CONTROL APPARATUS, CONTROL METHOD, AND RECORDING MEDIUM

(71) Applicant: CANON KABUSHIKI KAISHA, Tokyo (JP)

(72) Inventors: Shimpei Kitai, Chiba (JP); Koichi Okada, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 45 days.

(21) Appl. No.: 18/747,715

(22) Filed: Jun. 19, 2024

(65) Prior Publication Data

US 2024/0430563 A1 Dec. 26, 2024

(30) Foreign Application Priority Data

Jun. 22, 2023 (JP) ................................ 2023-102458

(51) Int. Cl.
*H04N 23/62* (2023.01)
*H04N 23/63* (2023.01)

(52) U.S. Cl.
CPC ........... *H04N 23/62* (2023.01); *H04N 23/634* (2023.01)

(58) Field of Classification Search
CPC .... H04N 23/62; H04N 23/634; H04N 23/631; H04N 23/632; H04N 23/633; H04N 23/63; H04N 23/667; H04N 23/66; H04M 1/72415; G06F 3/04886
See application file for complete search history.

(56) References Cited

U.S. PATENT DOCUMENTS

| | | | | |
|---|---|---|---|---|
| 9,606,718 | B2 | 3/2017 | Matsushima | |
| 2015/0326779 | A1 | 11/2015 | Tanaka | |
| 2016/0360116 | A1* | 12/2016 | Penha | G06V 20/00 |
| 2017/0257559 | A1* | 9/2017 | Stricker | H04N 23/631 |
| 2017/0272591 | A1* | 9/2017 | Odaira | H04N 1/00477 |
| 2021/0306552 | A1* | 9/2021 | Takeichi | H04N 23/62 |
| 2023/0118567 | A1* | 4/2023 | Manzari | H04N 23/69 348/231.2 |

FOREIGN PATENT DOCUMENTS

| | | | |
|---|---|---|---|
| JP | 5995637 | B2 | 9/2016 |

* cited by examiner

*Primary Examiner* — Kelly L Jerabek
(74) *Attorney, Agent, or Firm* — Canon U.S.A. Inc., IP Division

(57) ABSTRACT

An image capturing control apparatus includes a touch detection unit configured to detect a touch operation on a display unit, and a control unit configured to control recording of an image captured by an imaging unit, and a stop of the recording in accordance with a touch operation detected by the touch detection unit. In a case where recording of an image captured by the imaging unit is not being performed, the control unit controls recording of an image captured by the imaging unit, to be started in accordance with a touch operation on a first region in the display unit. In a case where recording of an image captured by the imaging unit is being performed, the control unit controls recording of an image captured by the imaging unit, to be stopped in accordance with a touch operation on a second region included in the first region.

14 Claims, 9 Drawing Sheets

206
STBY
401
402
404
REC
STBY
405
406
TimeCode
00:00:00:00P
410
Power
120min
411
403
412
A 9999min
B 12min
zoom
413
Focus
35cm AF
414
415
Shutter speed
1/100
Iris
F5.0
416
Face Detect
ON
417
418
ISO/Gain
102400
ND
1/16
419
WB
3000K
420

206
●REC
401
402
407
REC
●REC
408
409
TimeCode
00:00:00:00P
410
Power
120min
411
403
412
A 9999min
B 12min
zoom
413
Focus
35cm AF
414
415
Shutter speed
1/100
Iris
F5.0
416
Face Detect
ON
417
418
ISO/Gain
102400
ND
1/16
419
WB
3000K
420

IMAGE CAPTURING CONTROL APPARATUS, CONTROL METHOD, AND RECORDING MEDIUM

BACKGROUND OF THE INVENTION

Field of the Invention

The present invention relates to an image capturing control apparatus, a control method, and a recording medium.

Description of the Related Art

In recent years, an apparatus including a touch panel having both functions of a display device and an input device has been widely used.

An image capturing control apparatus such as a smartphone that includes an imaging unit and also a touch panel has become general. By performing a touch operation on an operation button displayed on the touch panel of the image capturing control apparatus, a user can intuitively operate the imaging unit. On the other hand, in such an image capturing control apparatus, the user sometimes performs an erroneous operation such as an unintentional touch on the touch panel.

Among erroneous operations, an operation requiring attention is an operation related to the recording of an image being captured by the imaging unit. An operation button for starting the recording of an image being captured is required to have a structure for enabling the user to swiftly perform a touch operation in such a manner as not to miss an image capturing chance. On the other hand, an operation button for stopping the recording of an image being captured is required to have a structure for preventing the recording of the image from being stopped by an unintentional touch operation. Some image capturing control apparatuses can remotely control an imaging unit via a communication function. In such image capturing control apparatuses, because information regarding the imaging unit is displayed in addition to the operation buttons, a region in which the operation buttons can be displayed is restricted.

Japanese Patent No. 5995637 discusses an imaging apparatus that controls, during the moving image capturing, the operation reception sensitivity of a touch operation detection unit to become higher than that in a case where a moving image is not being recorded, to reduce the possibility of camera shake caused by a touch panel operation.

Nevertheless, in the imaging apparatus discussed in Japanese Patent No. 5995637, because the operation reception sensitivity does not vary between a START icon and a STOP icon, there is a room for improvement for such an issue that the recording of an image is stopped by an unintentional touch operation.

SUMMARY OF THE INVENTION

The present invention is directed to preventing the recording of an image from being stopped by an unintentional touch operation.

According to an aspect of the present invention, an image capturing control apparatus includes a touch detection unit configured to detect a touch operation on a display unit, and a control unit configured to control recording of an image captured by an imaging unit, and a stop of the recording in accordance with a touch operation detected by the touch detection unit. In a case where recording of an image captured by the imaging unit is not being performed, the control unit controls recording of an image captured by the imaging unit, to be started in accordance with a touch operation on a first region in the display unit. In a case where recording of an image captured by the imaging unit is being performed, the control unit controls recording of an image captured by the imaging unit, to be stopped in accordance with a touch operation on a second region included in the first region.

Further features of the present invention will become apparent from the following description of exemplary embodiments with reference to the attached drawings.

DESCRIPTION OF THE EMBODIMENTS

Hereinafter, exemplary embodiments of the present invention will be described with reference to the drawings.

Configuration of System

Figure 1:
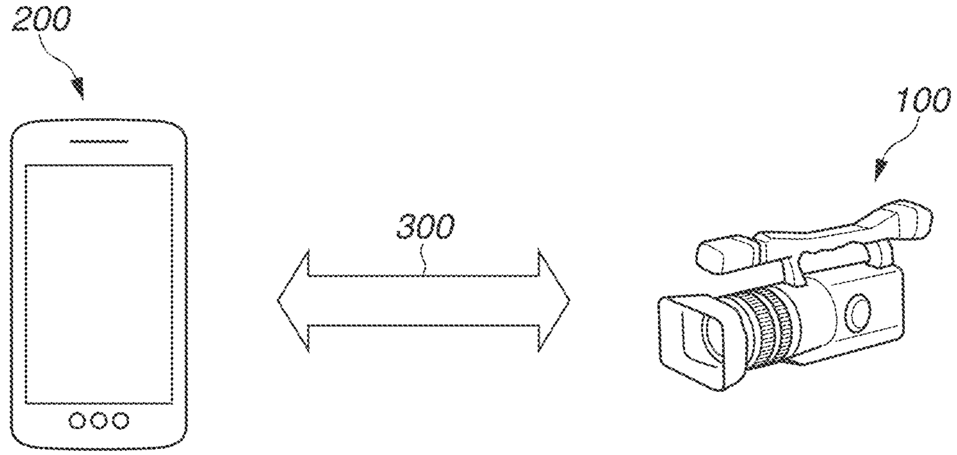
FIG. 1 is a diagram illustrating an example of a configuration of an imaging system according to a first exemplary embodiment.

FIG. 1 is a diagram illustrating an example of a configuration of an imaging system.

The imaging system includes a camera 100 serving as an imaging apparatus, and a smartphone 200 serving as an image capturing control apparatus. The camera 100 and the smartphone 200 are connected via a communication network 300 in such a manner that communication can be performed with each other.

The communication network 300 transmits and receives information such as images and camera setting values between the camera 100 and the smartphone 200. The communication network 300 is only required to employ a communication method that can transmit and receive information such as images and camera setting values, and wireless communication or wire communication can be used. As wireless communication, for example, a wireless communication method such as Wireless Fidelity (Wi-Fi) (registered trademark) or Bluetooth®, or a unique wireless communication method can be used. As wired communication, for example, a communication method such as Recommended Standard (RS)-232C, RS-422A, a universal serial bus (USB), or Ethernet (registered trademark) can be used.

Configuration of Camera

Figure 2:
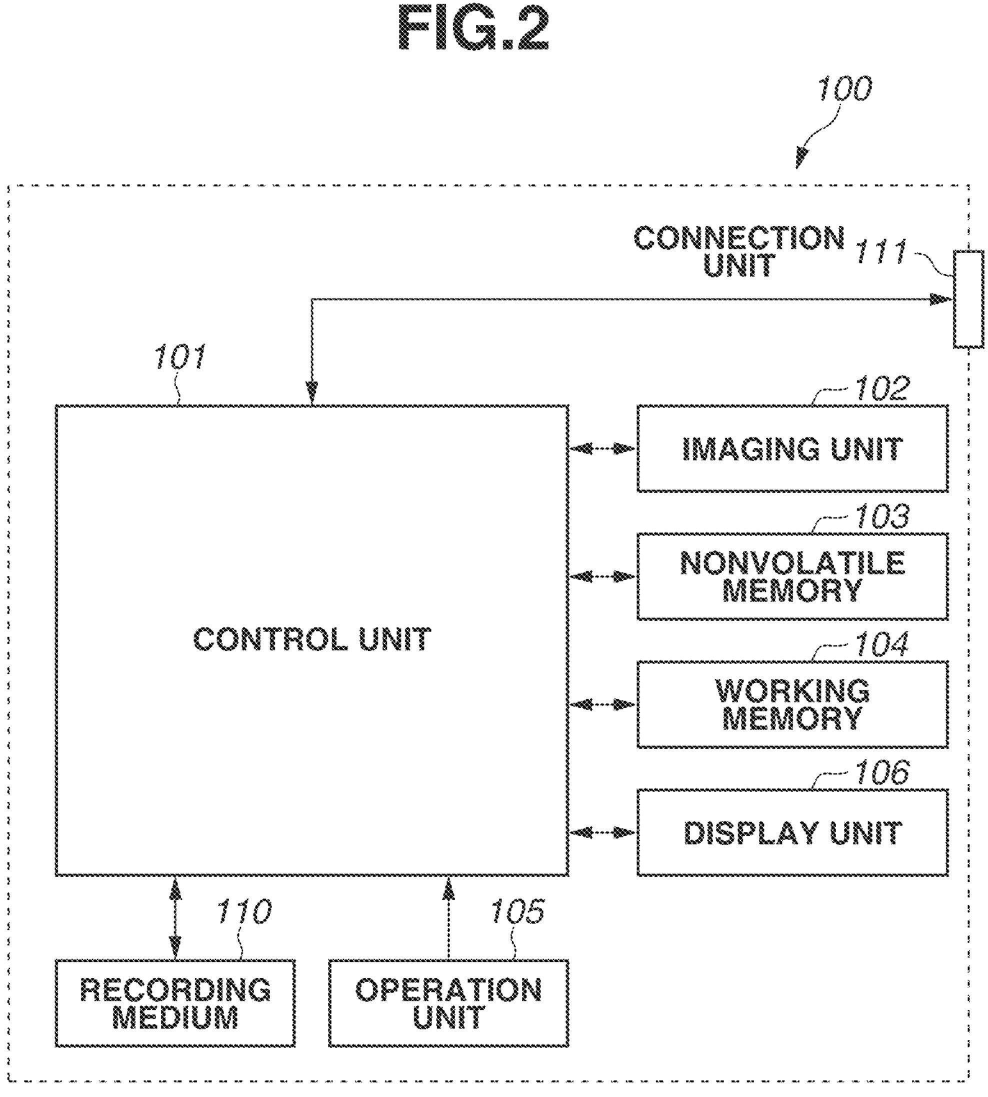
FIG. 2 is a block diagram illustrating a configuration of a camera.

FIG. 2 is a block diagram illustrating an example of a configuration of the camera 100. The description will now be given of a case where the camera 100 is a digital camera having a function of capturing a moving image, but the camera 100 is only required to be an apparatus that can capture an image. Accordingly, the camera 100 may be a tablet device, a personal computer, or the like that can capture an image, for example.

A control unit 101 controls the components of the camera 100 in accordance with input signals and various programs. Instead of the control unit 101 controlling the entire apparatus, a plurality of hardware components may control the entire apparatus while sharing processing.

An imaging unit 102 outputs digital data as image data by converting subject light condensed by a lens included in the imaging unit 102, into an electric signal, and performing noise reduction processing and the like. After image data obtained by image capturing is stored in a buffer memory, the control unit 101 performs predetermined calculation on the image data, and the image data is recorded in a recording medium 110 serving as a recording unit.

A nonvolatile memory 103 is an electrically erasable recordable nonvolatile memory. Various programs to be executed by the control unit 101 are recorded in the nonvolatile memory 103.

A working memory 104 is a buffer memory for temporarily storing image data of images captured by the imaging unit 102, or a memory for image display on a display unit 106. The working memory 104 is used as a work area of the control unit 101.

An operation unit 105 receives an instruction to the camera 100 from the user. The operation unit 105 includes operation members such as a power button for the user issuing an instruction to turn ON/OFF the power of the camera 100, a release switch for issuing an image capturing instruction, and a reproduction button for issuing a reproduction instruction of image data. The operation unit 105 also includes a touch panel formed on the display unit 106.

The release switch includes SW1 and SW2. By the release switch entering a so-called half-pressed state, SW1 is turned ON. By the SW1 of the release switch being turned ON, an instruction to perform image capturing preparation such as autofocus (AF) processing, autoexposure (AE) processing, auto white balance (AWB) processing, and electronic flash pre-emission (EF) processing is received. By the release switch entering a so-called fully-pressed state, SW2 is turned ON. By the SW2 of the release switch being turned ON, an instruction to perform image capturing is received.

The display unit 106 displays a viewfinder image in image capturing, displays image data obtained by image capturing, and displays texts for an interactive operation. The display unit 106 need not always be incorporated in the camera 100. The camera 100 is only required to be connectable to an internal or external display unit 106, and have a display control function of controlling the display on the display unit 106.

The recording medium 110 can record image data of images captured by the imaging unit 102. The recording medium 110 may be detachably attached to the camera 100, or may be incorporated in the camera 100. In other words, the camera 100 is only required to include at least means that accesses the recording medium 110.

A connection unit 111 is an interface for connecting with an external apparatus. The camera 100 according to the present exemplary embodiment can transmit and receive data to and from an external apparatus via the connection unit 111. The connection unit 111 according to the present exemplary embodiment includes an interface for communicating with an external apparatus via a wireless local area network (LAN). The control unit 101 implements wireless communication with an external apparatus by controlling the connection unit 111. The communication method is not limited to the wireless LAN.

The camera 100 according to the present exemplary embodiment can operate as a slave apparatus in an infrastructure mode of wireless LAN communication, and can participate in a network constructed by a nearby access point (hereinafter, AP), by connecting to the AP. The camera 100 according to the present exemplary embodiment can also operate as a simplified AP (hereinafter, simple AP) that is one type of an AP but has a more limited function. The AP according to the present exemplary embodiment is an example of a relay apparatus. If the camera 100 operates as a simple AP, the camera 100 constructs a network by itself. An apparatus existing near the camera 100 recognizes the camera 100 as an AP, and becomes able to participate in the network constructed by the camera 100. As described above, a program for operating the camera 100 is recorded in the nonvolatile memory 103. The camera 100 according to the present exemplary embodiment is a simple AP that is one type of an AP but does not have a gateway function of transferring data received from a slave apparatus, to an internet provider. Accordingly, even if the camera 100 receives data from a different apparatus participating in the network constructed by the camera 100, the camera 100 cannot transfer the received data to a network such as the internet. In addition, the connection unit 111 may be an interface for wire communication instead of wireless communication. More specifically, the connection unit 111 may be an interface for wired communication such as the RS-232C, the RS-422A, the USB, or the Ethernet.

Configuration of Smartphone

Figure 3A:
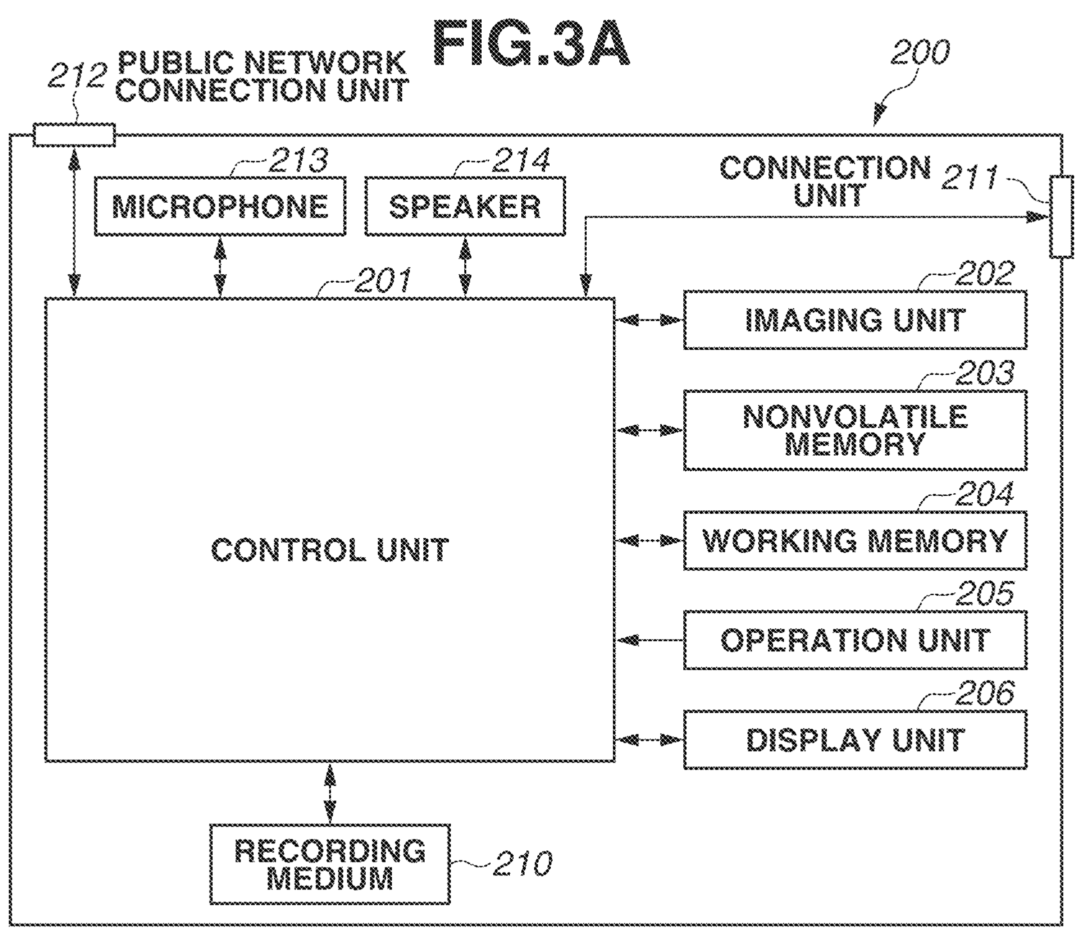
FIGS. 3A and 3B are block diagrams illustrating a configuration of a smartphone.

FIG. 3A is a block diagram illustrating an example of a configuration of the smartphone 200. The description will now be given of a case where the smartphone 200 has a telephone function, but the smartphone 200 is only required to be an apparatus that can control the camera 100 by communicating with the camera 100. Accordingly, the smartphone 200 may be an information processing apparatus having a communication function, such as a portable media player, a tablet device, or a personal computer, for example.

A control unit 201 controls the components of the smartphone 200 in accordance with input signals and programs to be described below. The control unit 201 also detects a touch operation on a display unit 206 (touch detection) based on information from the operation unit 205, and controls the display on the display unit 206. Instead of the control unit 201 controlling the entire apparatus, a plurality of hardware components may control the entire apparatus while sharing processing.

An imaging unit 202 outputs digital data as image data by converting subject light condensed by a lens included in the imaging unit 202, into an electric signal, and performing noise reduction processing and the like. After image data obtained by image capturing is stored in a buffer memory, the control unit 201 performs predetermined calculation on the image data, and the image data is recorded in a recording medium 210.

A nonvolatile memory 203 is an electrically erasable recordable nonvolatile memory. An operating system (OS) being basic software and various programs that are to be executed by the control unit 201 are recorded in the nonvolatile memory 203. A program for communicating with the camera 100 is also recorded in the nonvolatile memory 203. The program for communicating with the camera 100 is installed as a camera control application.

The processing to be executed by the smartphone 200 according to the present exemplary embodiment is implemented by reading a program provided by the camera control application. The camera control application includes a program for using a basic function (for example, a function of executing communication using a wireless LAN, an invoke function of other applications, etc.) of the OS installed on the smartphone 200. The camera control application also has a remote image capturing function of causing the camera 100 to execute image capturing, by a remote operation while displaying a live view image received from the camera 100, on the display unit 206. Furthermore, the camera control application has a remote browse function of remotely browsing image data recorded in the recording medium 110 of the camera 100, or receiving the image data. The OS of the smartphone 200 may include a program for implementing the processing according to the present exemplary embodiment.

A working memory 204 is a buffer memory for temporarily storing image data of images captured by the imaging unit 202, or a memory for image display on the display unit 206. The working memory 204 is used as a work area of the control unit 201.

An operation unit 205 receives an instruction to the smartphone 200 from the user. The operation unit 205 includes operation members such as a power button for the user issuing an instruction to turn ON/OFF the power of the smartphone 200, and a touch panel formed on the display unit 206, for example. The touch panel notifies the control unit 201 of information regarding a touch operation performed by the user on the display unit 206.

The display unit 206 displays image data, and displays texts for an interactive operation. The display unit 206 need not always be incorporated in the smartphone 200. The smartphone 200 is only required to be connectable to the display unit 206, and have a display control function of controlling the display on the display unit 206.

The recording medium 210 can record image data of images captured by the imaging unit 202, and image data received from the camera 100. The recording medium 210 may be detachably attached to the smartphone 200, or may be incorporated in the smartphone 200. In other words, the smartphone 200 is only required to include at least means that accesses the recording medium 210.

A connection unit 211 is an interface for connecting with an external apparatus. The smartphone 200 according to the present exemplary embodiment can transmit and receive data to and from an external apparatus via the connection unit 211. The connection unit 211 according to the present exemplary embodiment includes an interface for communicating with an external apparatus via a wireless LAN. The control unit 201 implements wireless communication with an external apparatus by controlling the connection unit 211.

The smartphone 200 according to the present exemplary embodiment can operate at least as a slave apparatus in the infrastructure mode of wireless LAN communication, and can participate in a network constructed by a nearby AP. In addition, by the camera 100 operating as a simple AP, the smartphone 200 may participate in a network constructed by the simple AP being the camera 100.

A public network connection unit 212 is an interface to be used in performing public network wireless communication.

The smartphone 200 can make a telephone conversation or perform data communication with an external apparatus via the public network connection unit 212. In the case of making a telephone conversation, the control unit 201 inputs and outputs voice signals via a microphone 213 and a speaker 214. The public network connection unit 212 according to the present exemplary embodiment is assumed to include an interface for performing communication that uses the third generation (3G) communication. The communication method of the public network connection unit 212 is not limited to the 3G, and may be another communication method that uses a fourth generation (4G) communication such as the Long Term Evolution (LTE) (registered trademark), the worldwide interoperability for microwave access (WiMAX) (registered trademark), the asymmetric digital subscriber line (ADSL), or the fiber to the home (FTTH). In addition, the connection unit 211 and the public network connection unit 212 need not always be independent hardware components. For example, one antenna may serve as the connection unit 211 and the public network connection unit 212.

Figure 3B:
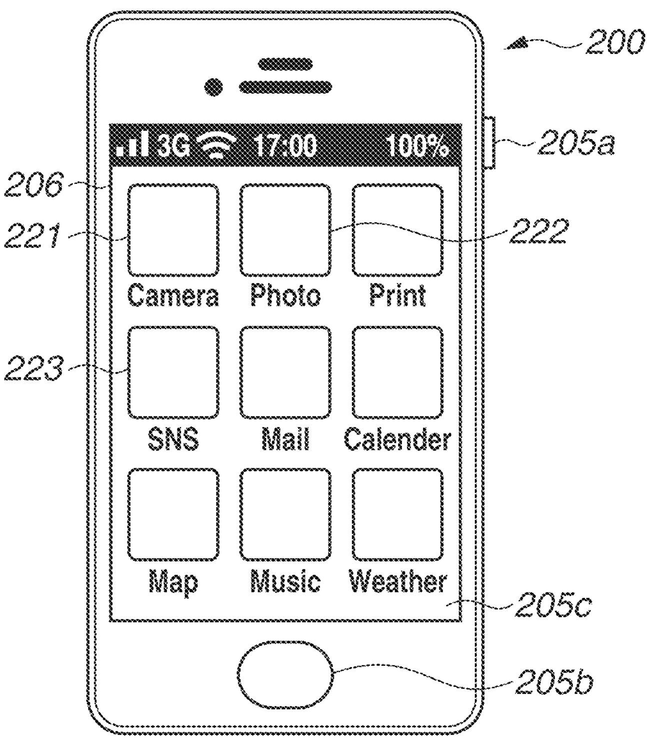

FIG. 3B is a diagram illustrating an example of a configuration of the external appearance of the smartphone 200.

The smartphone 200 includes a power button 205*a*, a home button 205*b*, and a touch panel 205*c*. The power button 205*a*, the home button 205*b*, and the touch panel 205*c* are the above-described operation members included in the operation unit 205.

By pressing the home button 205*b*, the user can stop the use of a running application, and display a home screen for making other applications selectable, on the display unit 206. Display items corresponding to the applications are arranged on the home screen of the smartphone 200. Each application can be activated and an application running in the background can be invoked on the home screen.

A display item 221 is an item for activating the camera control application for the smartphone 200 communicating with the camera 100.

A display item 222 is an item for activating an image display application for the user browsing an image recorded in the smartphone 200.

A display item 223 is an item for activating a social networking service (SNS) application for sharing images and texts with other users by communicating with a server.

The camera control application according to the present exemplary embodiment is an application to be provided by a manufacturer of the camera 100 via an application delivery website, for example. The image display application is an application preinstalled on the smartphone 200 (standard application installed on the OS of the smartphone 200), for example. The SNS application is an application to be provided by a developer of the application via an application delivery website, for example.

If the display item 221 is pressed (touched) on the home screen, for example, in a case where the camera control application has not been activated, the camera control application is newly activated and a screen is displayed. On the other hand, in a case where the camera control application has already been running in the background, without activating the camera control application again, the camera control application is shifted to the foreground and a screen is displayed again.

On the smartphone 200, by inputting a specific instruction to the OS, it is possible to switch or execute an application not via the home screen. At this time, an application that is running when the specific instruction is input is shifted to the background. Then, the application switched in accordance with the instruction is newly activated, or operates after being shifted to the foreground from the background.

In the following description, the smartphone 200 will be sometimes described as executing processing, but actually, the control unit 201 implements various types of processing by reading programs stored in the nonvolatile memory 203. The camera 100 will be sometimes described as executing processing, but similarly, the control unit 101 implements various types of processing by reading programs stored in the nonvolatile memory 103.

Description of Screen Displayed on Display Unit 206 of Smartphone 200

Figures 4A, 4B:
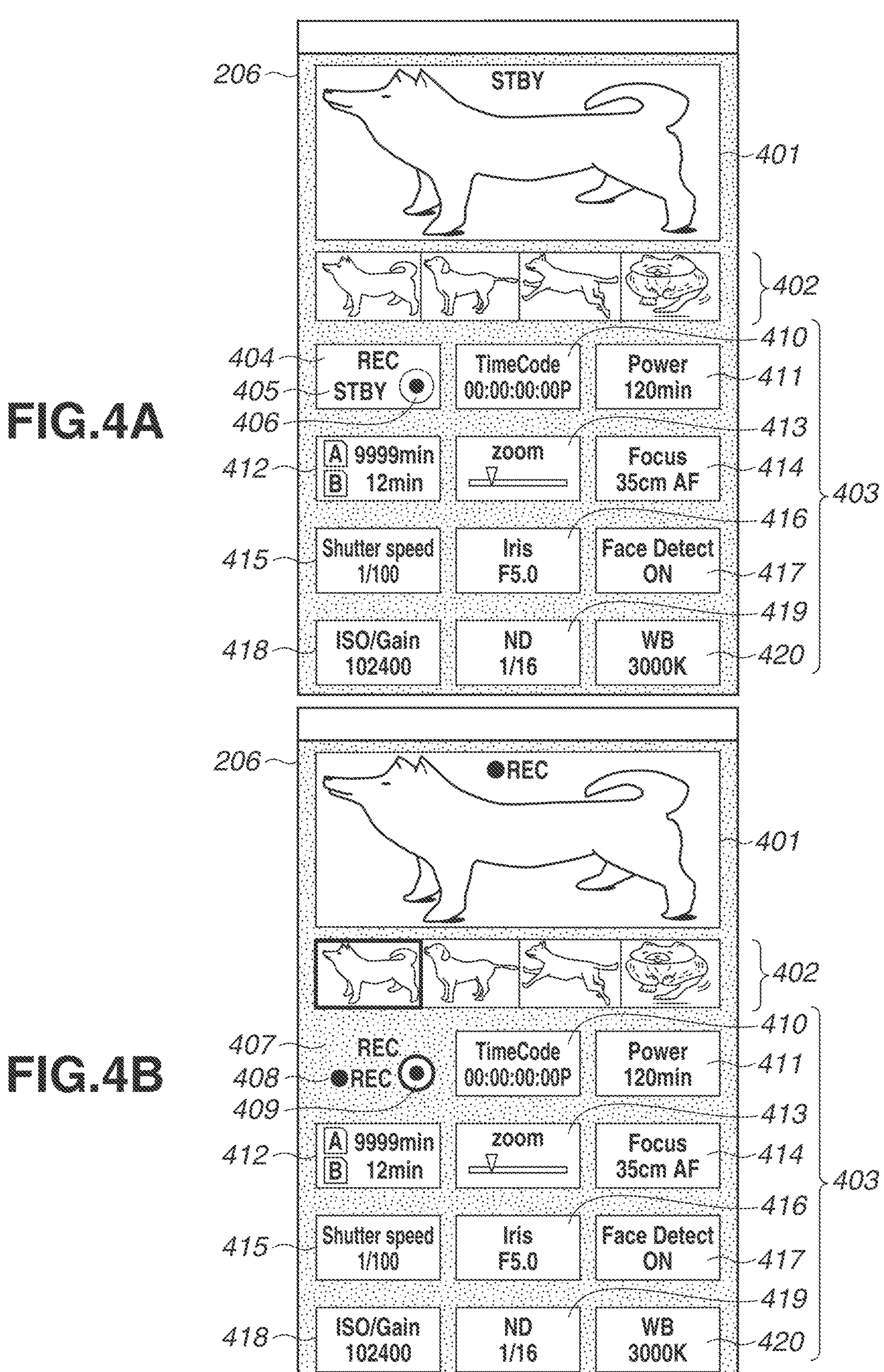
FIGS. 4A and 4B are diagrams each illustrating an example of a screen to be displayed on a display unit of the smartphone.

FIGS. 4A and 4B are diagrams each illustrating an example of a screen to be displayed on the display unit 206 of the smartphone 200 by the camera control application being executed. In the present exemplary embodiment, the smartphone 200 can simultaneously communicate with a plurality of cameras 100, change the setting values of the cameras 100, and issue a moving image recording start instruction and a moving image recording stop instruction to the cameras 100. The smartphone 200 can also communicate with the camera 100, receive an image (live view image) being captured by the camera 100 and various current setting values of the camera 100, and display these on the display unit 206.

FIG. 4A is a diagram illustrating an example of a screen showing a state caused before a moving image is recorded.

Here, the smartphone 200 communicates with the camera 100, receives an image being captured by the camera 100 and various current setting values of the camera 100, and displays these on the display unit 206.

A camera image region 401 is a region in which an image desired to be mainly checked by the user among images received from the cameras 100 is to be displayed. In the camera image region 401 illustrated in FIG. 4A, "STBY" is displayed, and this indicates that the camera 100 (hereinafter, will be referred to as a main camera) that is capturing an image displayed in the camera image region 401 is not recording a moving image.

A camera image region 402 is a region in which images received from the cameras 100 are displayed side by side. By selecting an image displayed in the camera image region 402, the user can change a main camera.

An operation button display region 403 is a region in which a plurality of operation buttons 404 and 410 to 420 are to be displayed. In this example, the operation buttons 404 and 410 to 420 are displayed with being arrayed in a left-right direction and an up-down direction. The shapes of the operation buttons 404 and 410 to 420 are all the same.

The shapes of the operation buttons 404 and 410 to 420 according to the present exemplary embodiment are quadrangles.

The operation buttons 404 and 410 to 420 are buttons for operating the main camera. In addition, various current setting values of the main camera and information indicating the state of the main camera, which have been received from the main camera, are displayed with being superimposed on the operation buttons 404 and 410 to 420. The various current setting values of the main camera and the information indicating the state of the main camera serve as an example of information regarding the camera. By performing a touch operation on any operation button of the operation buttons 404 and 410 to 420, the user can change the current setting value or the state. The screen of the smartphone 200 may transition to a screen for changing the current setting value or the state, in accordance with a touch operation on any of the operation buttons 404 and 410 to 420.

The operation button 404 is a button for issuing an instruction to start the recording of a moving image. The operation button 404 is a display item to be displayed when the main camera is not performing the recording of a moving image. The operation button 404 according to the present exemplary embodiment is displayed at a position in the display unit 206 that leans to one side (left side) in the left-right direction.

A "STBY" mark 405 indicating that the main camera is in a state of not performing the recording of a moving image is displayed with being superimposed on the operation button 404. A display item 406 for causing the user to recognize that the operation button 404 is a button for issuing an instruction to start the recording of a moving image is also displayed with being superimposed on the operation button 404. The shape of the display item 406 is a circle. Specifically, the display item 406 has a shape including a circle filled with a first color, and an annular thin line surrounding the circle.

In accordance with a touch operation being performed by the user on the operation button 404, the control unit 201 of the smartphone 200 transmits an instruction to start the recording of a moving image, to the main camera via the connection unit 211. On the other hand, in accordance with the reception of the instruction from the smartphone 200, the control unit 101 of the camera 100 starts the recording of a moving image. The control unit 101 of the camera 100 also transmits, to the smartphone 200 via the connection unit 111, a notification indicating that the state of the camera 100 has changed from a moving image recording standby state to a moving image recording state.

FIG. 4B is a diagram illustrating an example of a screen showing a state in which a moving image is being recorded.

In the camera image region 401 illustrated in FIG. 4B, "REC" is displayed, and this indicates that the main camera is recording a moving image.

In FIG. 4B, the display mode of the operation button 404 displayed in FIG. 4A is changed, and an inoperable button 407 is displayed. The inoperable button 407 is a display item presenting that a touch operation is disabled, to the user. The inoperable button 407 is displayed by changing the background color and an outline (outer frame) of the operation button 404 in FIG. 4A. Specifically, the background color is changed in such a manner that the background color of the inoperable button 407 becomes the same color as the color of a region existing outside the operation button 404. In addition, the outline is changed in such a manner that the outline of the inoperable button 407 is deleted. By changing the operation button 404 to the inoperable button 407 in this manner, the inoperable button 407 is displayed as if the operation button 404 disappeared. Accordingly, based on the inoperable button 407 according to the present exemplary embodiment, the user can recognize that, even if a touch operation is performed on a region in which the operation button 404 is displayed in FIG. 4A, no reaction is to be obtained.

The inoperable button 407 according to the present exemplary embodiment can also be referred to as a nondisplay region.

The display mode change method is not limited to the method of changing the background color in such a manner that the background color of the inoperable button 407 becomes the same color as the color of a region existing outside the operation button 404. For example, by changing the background color to a color (e.g., gray, etc.) different from the background color of the operation button 404, the inoperable button 407 may enable the user to recognize that, even if a touch operation is performed on the region, no reaction is to be obtained.

A "REC" mark 408 indicating that the main camera is in the state of recording a moving image is also displayed with being superimposed on the inoperable button 407 (or the position where the operation button 404 is displayed in FIG. 4A). More specifically, by the main camera recording a moving image, a state mark is displayed with being changed from the "STBY" mark 405 in FIG. 4A to the "REC" mark 408. An operation button 409 for stopping the recording of a moving image is also displayed on the inoperable button 407 (or the position where the operation button 404 is displayed in FIG. 4A). The operation button 409 also serves as a display item (will also be referred to as a display item 409) for causing the user to recognize that the operation button 409 is a button for issuing an instruction to stop the recording of a moving image. More specifically, by the main camera recording a moving image, the display item 409 changed from the display item 406 is displayed. The shape of the display item 409 is a circle. Specifically, the display item 409 has a shape including a circle filled with a second color, and an annular thick line surrounding the circle.

By displaying the screen in this manner, the user recognizes that the recording of a moving image can be started by performing a touch operation on the operation button 404 illustrated in FIG. 4A. On the other hand, the user recognizes that, even if a touch operation is performed on the inoperable button 407 illustrated in FIG. 4B (or the position where the operation button 404 is displayed in FIG. 4A), no reaction is to be obtained, and the recording of a moving image can be stopped by performing a touch operation on the operation button 409.

In accordance with a touch operation being performed by the user on the operation button 409, the control unit 201 of the smartphone 200 transmits an instruction to stop the recording of a moving image, to the main camera via the connection unit 211. On the other hand, in accordance with the reception of the instruction from the smartphone 200, the control unit 101 of the camera 100 stops the recording of a moving image. The control unit 101 of the camera 100 also transmits, to the smartphone 200 via the connection unit 111, a notification indicating that the state of the camera 100 has changed from the moving image recording state to the moving image recording standby state.

Figure 5A:
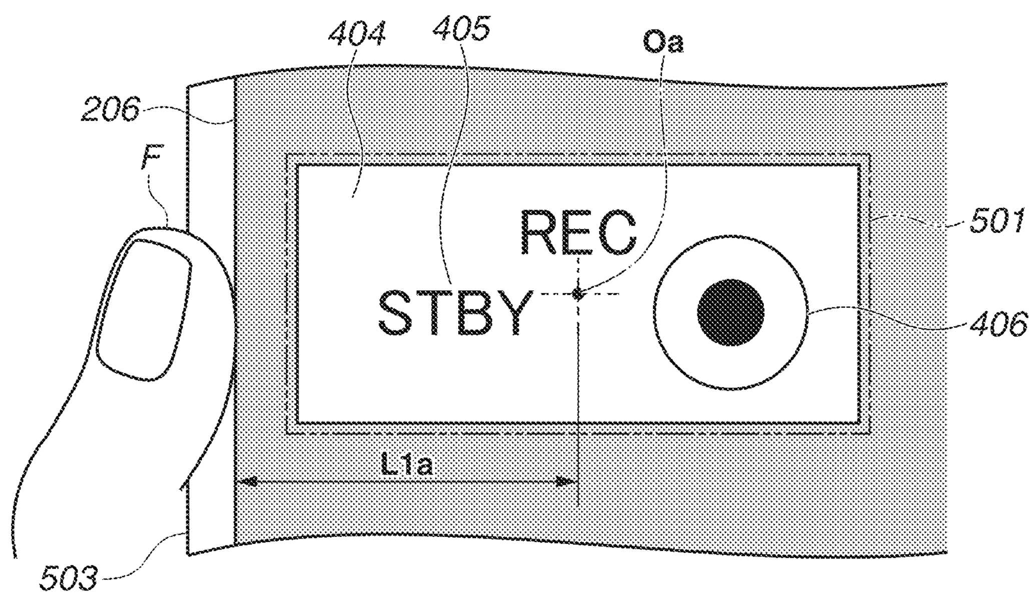
FIGS. 5A and 5B are diagrams each illustrating a region in which a touch operation on an operation button is to be received.
Figure 5B:
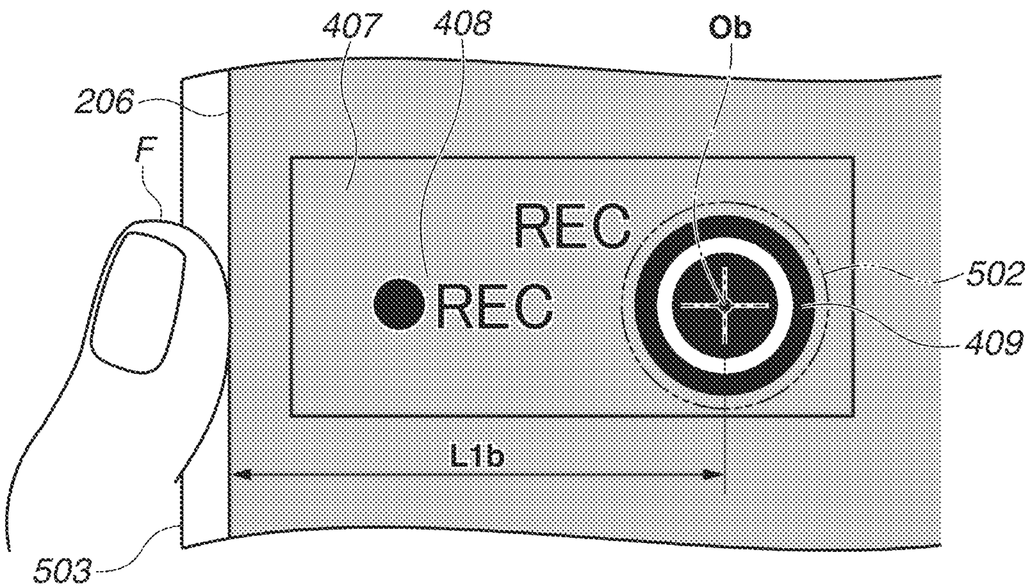

FIGS. 5A and 5B are diagrams illustrating regions in which touch operations on the operation button 404 and the operation button 409 are to be received.

FIG. 5A is a diagram illustrating a region in which a touch operation on the operation button 404 is to be received. The same components as the components described with reference to FIG. 4A are assigned the same reference numerals, and the description will be appropriately omitted.

The region in which a touch operation on the operation button 404 is to be received is a touch region 501 (first region). In other words, an operation unit corresponding to the touch region 501 is the operation button 404. In FIG. 5A, the outline of the touch region 501 is indicated by an imaginary line (dashed-two dotted line). The shape of the touch region 501 is a quadrangle. The center of the touch region 501 is indicated as a center Oa. In this example, the center Oa of the touch region 501 is positioned at a distance L1*a* from the end of a touch reception region in which a touch operation can be received (the end closest to the touch region 501).

In the present exemplary embodiment, display regions of the touch region 501 and the operation button 404 are substantially the same.

By the user performing a touch operation at any position inside the touch region 501, the control unit 101 detects the touch operation on the operation button 404, and transmits an instruction to start the recording of a moving image, to the main camera.

FIG. 5B is a diagram illustrating a region in which a touch operation on the operation button 409 is to be received. The same components as the components described with reference to FIG. 4B are assigned the same reference numerals, and the description will be appropriately omitted. For the ease of understanding, the outline of the inoperable button 407 is displayed.

The region in which a touch operation on the operation button 409 is to be received a touch region 502 (second region). In other words, an operation member corresponding to the touch region 502 is the operation button 409. In FIG. 5B, the outline of the touch region 502 is indicated by an imaginary line (dashed-two dotted line). The shape of the touch region 502 is a circle. The center of the touch region 502 is indicated as a center Ob. In addition, the center Ob of the touch region 502 is positioned at a distance L1*b* from the end of the touch reception region in which a touch operation can be received (the end closest to the touch region 501).

In the present exemplary embodiment, display regions of the touch region 502 and the operation button 409 are substantially the same.

By the user performing a touch operation at any position inside the touch region 502, the control unit 101 detects the touch operation on the operation button 409, and transmits an instruction to stop the recording of a moving image, to the main camera. On the other hand, even if the user performs a touch operation at a position that is included in the touch region 501 in FIG. 5A and exists outside the touch region 502, the touch operation is not received, and the control unit 101 does not transmit an instruction to stop the recording of a moving image, to the main camera.

The touch region 501 in FIG. 5A and the touch region 502 in FIG. 5B will be compared.

The touch region 502 is a region positioned inside the touch region 501. In other words, the touch region 502 is a region included in the touch region 501. By positioning the touch region 502 in this manner, the user can avoid unintentionally performing a touch operation on the touch region 502. In contrast, the user can easily perform a touch operation on the touch region 501.

An area of the touch region 502 is smaller than an area of the touch region 501. The area of the touch region 502 is equal to or smaller than ¾ of the area of the touch region 501, and furthermore, equal to or smaller than ½ of the area of the touch region 501. By forming the touch region 502 in this manner, the user can avoid unintentionally performing a touch operation on the touch region 502. In this example, the area of the touch region 502 is equal to or smaller than 1/20 of the area of the touch region 501, and furthermore, equal to or smaller than 1/10 of the area of the touch region 501.

The distance L1*b* from the end of the touch reception region to the center Ob of the touch region 502 is longer than the distance L1*a* from the end of the touch reception region to the center Oa of the touch region 501. By positioning the touch region 502 in this manner, the user can avoid unintentionally performing a touch operation on the touch region 502 with a finger F holding the smartphone 200.

The position determination method is not limited to the method of determining the position based on the end of the touch reception region, and the position may be determined based on an end 503 of a casing of the smartphone 200. More specifically, a distance from the end 503 of the casing of the smartphone 200 to the center Ob of the touch region 502 is longer than a distance from the end 503 of the casing of the smartphone 200 to the center Oa of the touch region 501.

Figure 6:
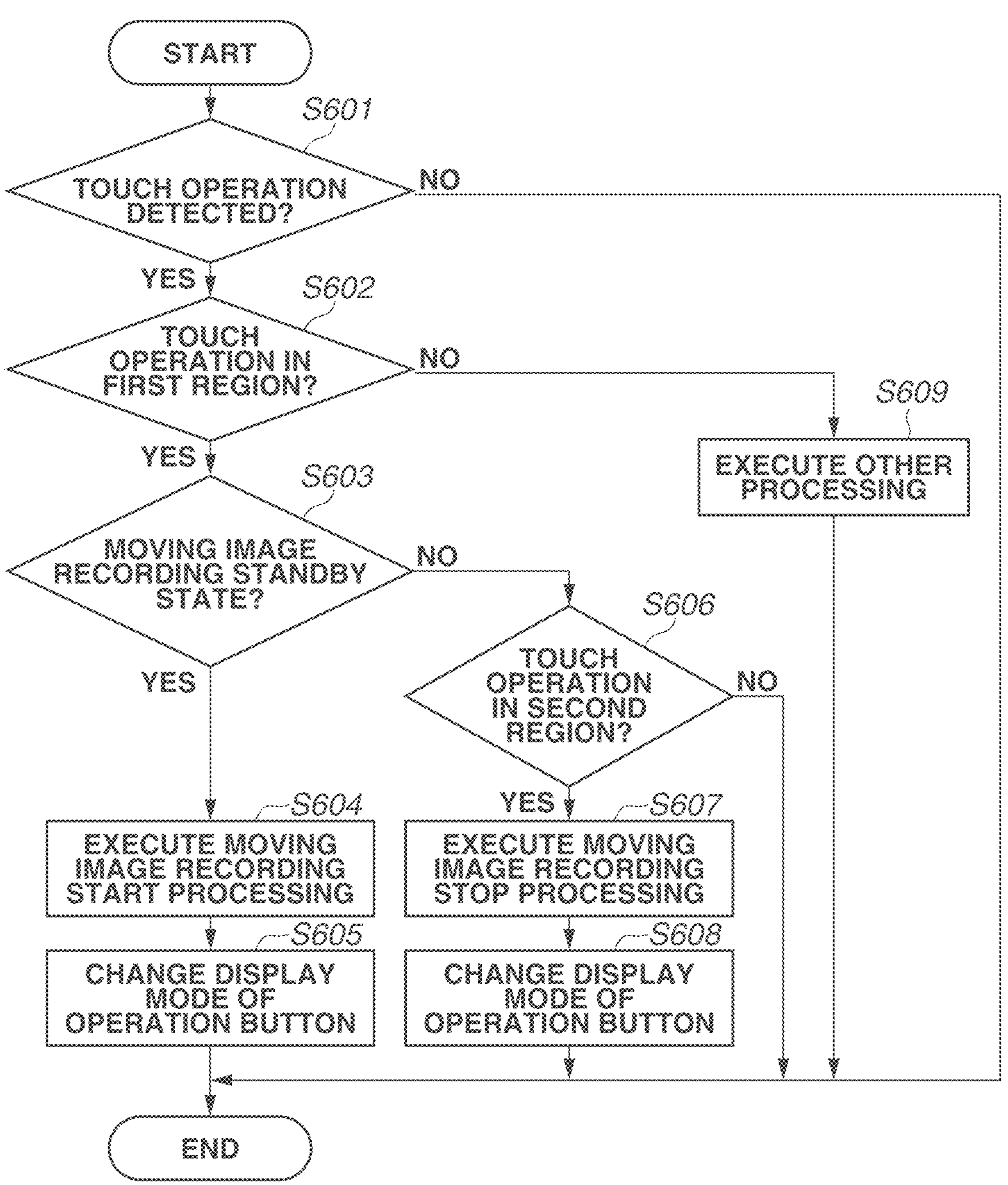
FIG. 6 is a flowchart illustrating an example of processing to be performed by the smartphone.

Next, processing in which the control unit 201 of the smartphone 200 receives a touch operation will be described with reference to a flowchart in FIG. 6. The processing in the flowchart in FIG. 6 is started by the control unit 201 of the smartphone 200 activating the camera control application.

In step S601, the control unit 201 determines whether a touch operation on the display unit 206 has been detected. In a case where a touch operation has been detected (YES in step S601), the processing proceeds to step S602, and in a case where a touch operation has not been detected (NO in step S601), the control unit 201 ends the processing in the flowchart in FIG. 6.

In step S602, the control unit 201 determines whether a coordinate of the touch operation falls within the touch region 501 (first region) corresponding to the operation button 404. In a case where the coordinate of the touch operation falls within the touch region 501 illustrated in FIG. 5A (YES in step S602), the processing proceeds to step S603.

In step S603, the control unit 201 determines whether the camera 100 is in the moving image recording standby state. The control unit 201 determines whether the main camera is in the moving image recording standby state or in the moving image recording state, based on information regarding a camera state that has been received from the main camera. In a case where the camera 100 is in the moving image recording standby state (YES in step S603), the processing proceeds to step S604, and in a case where the camera 100 is in the moving image recording state (NO in step S603), the processing proceeds to step S606.

In step S604, the control unit 201 controls the camera 100 to record a moving image. Specifically, the control unit 201 transmits an instruction to start the recording of a moving image, to the main camera via the connection unit 211.

In step S605, the control unit 201 changes the display mode of the operation button 404 displayed in the display unit 206. Specifically, by changing the display mode in such a manner that the operation button 404 illustrated in FIG. 5A changes to the inoperable button 407 illustrated in FIG. 5B, the control unit 201 displays the inoperable button 407 as if the operation button 404 disappeared. In addition, the control unit 201 changes the display mode in such a manner that the display item 406 illustrated in FIG. 5A changes to the display item 409 (the operation button 409) illustrated in FIG. 5B. Furthermore, the control unit 201 changes the display mode in such a manner that the “STBY” mark 405 illustrated in FIG. 5A changes to the “REC” mark 408 illustrated in FIG. 5B.

By ending the processing in step S605, the control unit 201 ends the processing in the flowchart in FIG. 6.

In a case where it is determined in step S603 described above that the camera 100 is not in the moving image recording standby state (in a case where the camera 100 is in the moving image recording state) (NO in step S603), the processing proceeds to step S606. Because the control unit 201 has already performed the processing in step S605 in the case where the camera 100 is in the moving image recording state, the inoperable button 407 and the operation button 409 illustrated in FIG. 5B are displayed in this state.

In step S606, the control unit 201 determines whether a coordinate of the touch operation falls within the touch region 502 (second region) corresponding to the operation button 409. In a case where the coordinate of the touch operation falls within the touch region 502 illustrated in FIG. 5B (YES in step S606), the processing proceeds to step S607.

In step S607, the control unit 201 controls the camera 100 to stop the recording of a moving image. Specifically, the control unit 201 transmits an instruction to stop the recording of a moving image, to the main camera via the connection unit 211.

In step S608, the control unit 201 changes the display mode of the inoperable button 407 displayed in the display unit 206. Specifically, by changing the display mode in such a manner that the inoperable button 407 illustrated in FIG. 5B changes to the operation button 404 illustrated in FIG. 5A, the control unit 201 enables the user to recognize that the recording of a moving image can be started by performing a touch operation on the operation button 404.

The control unit 201 changes the display mode in such a manner that the display item 409 (the operation button 409) illustrated in FIG. 5B changes to the display item 406 illustrated in FIG. 5A. Furthermore, the control unit 201 changes the display mode in such a manner that the “REC” mark 408 illustrated in FIG. 5B changes to the “STBY” mark 405 illustrated in FIG. 5A.

By ending the processing in step S608, the control unit 201 ends the processing in the flowchart in FIG. 6.

In a case where it is determined in step S606 described above that the coordinate of the touch operation does not fall within the touch region 502 (NO in step S606), the control unit 201 ends the processing in the flowchart in FIG. 6, without responding to the touch operation. The case where the coordinate of the touch operation does not fall within the touch region 502 (NO in step S606) corresponds to a case where the camera 100 is in the moving image recording state and a touch operation has been performed at a position outside the touch region 502 illustrated in FIG. 5B. In this case, considering that the user might has unintentionally performed the touch operation, the control unit 201 controls the recording of a moving image to continue, without stopping the recording.

In a case where it is determined in step S602 described above that the coordinate of the touch operation does not fall within the touch region 501 (NO in step S602), the processing proceeds to step S609.

In step S609, the control unit 201 performs other processing corresponding to the touch operation. For example, in a case where the user has performed a touch operation on any of the operation buttons 410 to 420 illustrated in FIG. 4A, in accordance with the touch operation on any of the operation buttons 410 to 420, the control unit 201 changes a current setting value or a state, or causes a screen to transition to a screen for changing a current setting value or a state.

By ending the processing in step S609, the control unit 201 ends the processing in the flowchart in FIG. 6.

In this manner, according to the present exemplary embodiment, the control unit 201 controls the recording of a moving image to be stopped in accordance with a touch operation on the touch region 502 (second region) included in the touch region 501 (first region) that is performed in a case where the recording of a moving image is being performed. Accordingly, because the user can avoid unintentionally performing a touch operation on the touch region 502 (second region), it is possible to prevent the recording of a moving image from being stopped by an erroneous operation.

On the other hand, the control unit 201 controls the recording of a moving image to be started in accordance with a touch operation on the touch region 501 (first region) including the touch region 502 (second region) that is performed in a case where the recording of a moving image is not being performed. Accordingly, because the user can easily issue an instruction to start the recording of a moving image, by performing a touch operation on the touch region 501 (first region), it is possible to avoid missing a chance to record a moving image.

In the case of changing the display mode from the operation button 404 to the inoperable button 407 in the above-described exemplary embodiment, the display mode may be changed by changing at least one of a shape, a color, or a line width.

In the case of changing the display mode from the display item 406 to the display item 409 in the above-described exemplary embodiment, the display mode may be changed by changing at least one of a shape, a color, or a line width.

Figure 7A:
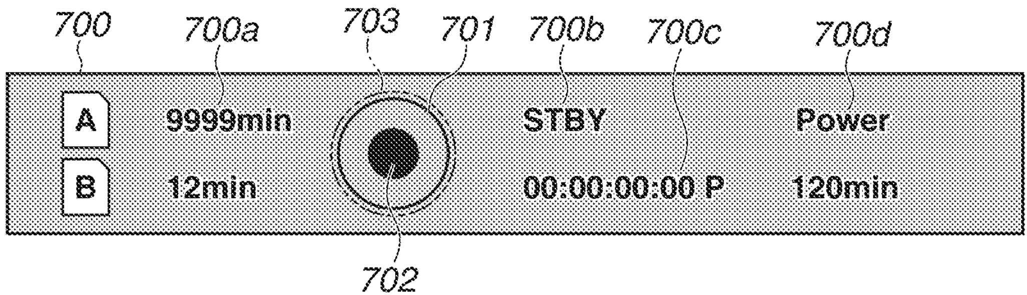
FIGS. 7A to 7C are diagrams each illustrating a region according to a second exemplary embodiment in which a touch operation on an operation button is to be received.
Figure 7B:
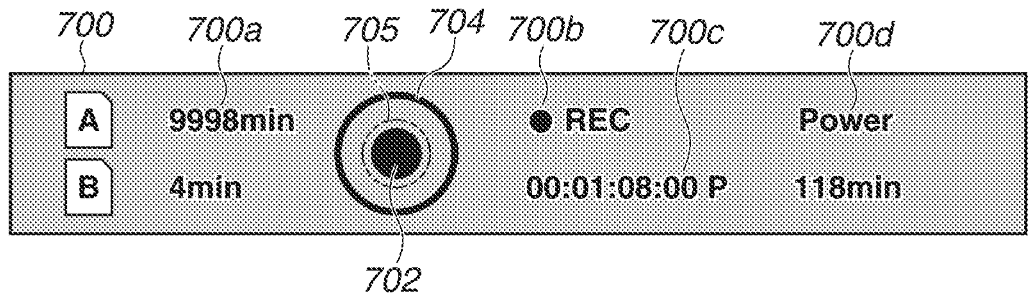
Figure 7C:
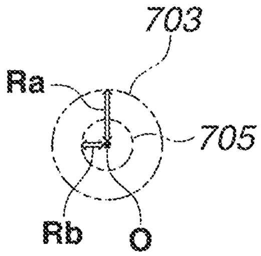

FIGS. 7A to 7C are diagrams each illustrating a configuration of an operation button display region 700 according to a second exemplary embodiment. In the operation button display region 700, information indicating the state of the main camera that has been received from the main camera is displayed in a superimposed manner. Specifically, information elements indicating camera states such as a media remaining capacity 700*a*, a camera recording operating state 700*b*, a time code 700*c*, and a battery remaining amount 700*d* are displayed together in the operation button display region 700.

FIG. 7A is a diagram illustrating an example of the operation button display region 700 to be displayed before a moving image is recorded.

An operation button 701 is displayed in the operation button display region 700. The operation button 701 is a button for issuing an instruction to start the recording of a moving image. The operation button 701 is a display item to be displayed when the main camera is not performing the recording of a moving image. The shape of the operation button 701 is a circle. Specifically, the operation button 701 has a shape including an annular thin line. A display item 702 is displayed with being superimposed on the operation button 701. The shape of the display item 702 is a circle. Specifically, the display item 702 is a filled circle.

A region in which a touch operation on the operation button 701 is to be received is a touch region 703 (first region). In other words, an operation unit corresponding to the touch region 703 is the operation button 701. In FIG. 7A, the outline of the touch region 703 is indicated by an imaginary line (dashed-two dotted line). The shape of the touch region 703 is a circle.

In the present exemplary embodiment, display regions of the touch region 703 and the operation button 701 are substantially the same.

By the user performing a touch operation at any position inside the touch region 703, the control unit 101 detects the touch operation on the operation button 701, and transmits an instruction to start the recording of a moving image, to the main camera.

FIG. 7B is a diagram illustrating an example of a screen showing a state in which a moving image is being recorded. In FIG. 7B, by a moving image being recorded, camera states such as the media remaining capacity 700*a*, the camera recording operating state 700*b*, the time code 700*c*, and the battery remaining amount 700*d* are displayed in a changed state.

In FIG. 7B, the display mode of the operation button 701 is changed and an inoperable button 704 is displayed. The inoperable button 704 is displayed by changing the line width of the annular thin line of the operation button 701 in FIG. 7A to a thick line. On the other hand, the display item 702 is displayed without its display mode being changed from the display mode in FIG. 7A, and serves as a button (will also be referred to as an operation button 702) for issuing an instruction to stop the recording of a moving image.

A region in which a touch operation on the operation button 702 is to be received is a touch region 705 (second region). In other words, an operation unit corresponding to the touch region 705 is the operation button 702. In FIG. 7B, the outline of the touch region 705 is indicated by an imaginary line (dashed-two dotted line). The shape of the touch region 705 is a circle. The touch region 705 is a region positioned inside the touch region 703.

In the present exemplary embodiment, display regions of the touch region 705 and the operation button 702 are substantially the same.

By the user performing a touch operation at any position inside the touch region 705, the control unit 101 detects the touch operation on the operation button 702, and transmits an instruction to stop the recording of a moving image, to the main camera. On the other hand, even if the user performs a touch operation at a position that is included in the touch region 703 in FIG. 7A and exists outside the touch region 705, the touch operation is not received, and the control unit 101 does not transmit an instruction to stop the recording of a moving image, to the main camera.

FIG. 7C is a diagram for comparing the positions and the size of the touch region 703 and the touch region 705.

The touch region 705 is a region positioned inside the touch region 703. In other words, the touch region 705 is a region included in the touch region 703. The position of a center O of the touch region 703 and the position of a center O of the touch region 705 are the same. A distance Ra from the center O to the outline of the touch region 703 is longer than a distance Rb from the center O to the outline of the touch region 705.

By setting the position and the size of the touch region 705 in this manner, the user can avoid unintentionally performing a touch operation on the touch region 705.

Figure 8A:
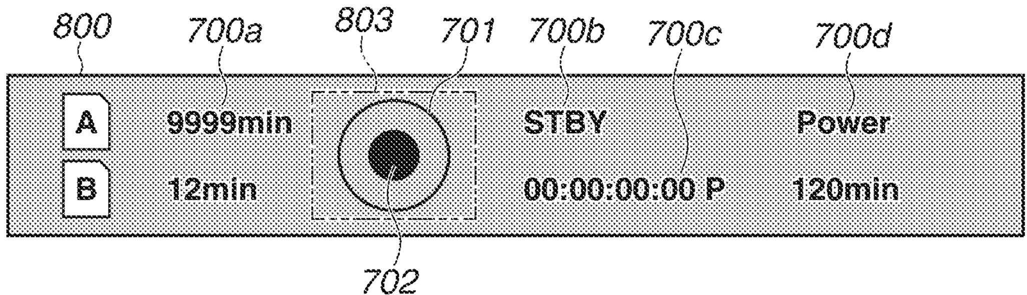
FIGS. 8A to 8C are diagrams each illustrating a region according to a third exemplary embodiment in which a touch operation on an operation button is to be received.
Figure 8B:
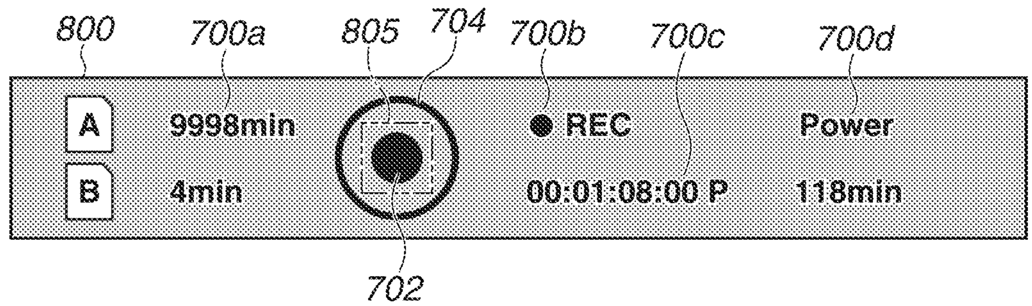
Figure 8C:
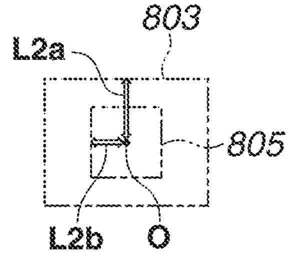

FIGS. 8A to 8C are diagrams each illustrating a configuration of an operation button display region 800 according to a third exemplary embodiment. The components similar to those in the second exemplary embodiment are assigned the same reference numerals, and the description will be omitted.

FIG. 8A is a diagram illustrating an example of the operation button display region 800 to be displayed before a moving image is recorded.

A region in which a touch operation on the operation button 701 is to be received is a touch region 803 (first region). In other words, an operation unit corresponding to the touch region 803 is the operation button 701. In FIG. 8A, the outline of the touch region 803 is indicated by an imaginary line (dashed-two dotted line). The shape of the touch region 803 is a quadrangle.

In the present exemplary embodiment, the touch region 803 is larger than a display region of the operation button 701. In addition, the shape (quadrangle) of the touch region 803 differs in type from the shape (circle) of the operation button 701. By the user performing a touch operation at any position inside the touch region 803, the control unit 101 detects the touch operation on the operation button 701, and transmits an instruction to start the recording of a moving image, to the main camera.

FIG. 8B is a diagram illustrating an example of a screen showing a state in which a moving image is being recorded.

A region in which a touch operation on the operation button 702 is to be received is a touch region 805 (second region). In other words, an operation unit corresponding to the touch region 805 is the operation button 702. In FIG. 8B, the outline of the touch region 805 is indicated by an imaginary line (dashed-two dotted line). The shape of the touch region 805 is a quadrangle. The touch region 805 is a region positioned inside the touch region 803.

In the present exemplary embodiment, the touch region 805 is larger than a display region of the operation button 702. In addition, the shape (quadrangle) of the touch region 805 differs in type from the shape (circle) of the operation button 702. By the user performing a touch operation at any position inside the touch region 805, the control unit 101 detects the touch operation on the operation button 702, and transmits an instruction to stop the recording of a moving image, to the main camera.

FIG. 8C is a diagram for comparing the positions and the size of the touch region 803 and the touch region 805.

The touch region 805 is a region positioned inside the touch region 803. In other words, the touch region 805 is a region included in the touch region 803. The position of a center O of the touch region 803 and the position of a center O of the touch region 805 are the same. A distance L2*a* from the center O to the outline of the touch region 803 is longer than a distance L2*b* from the center O to the outline of the touch region 805.

By setting the position and the size of the touch region 805 in this manner, the user can avoid unintentionally performing a touch operation on the touch region 805.

Figure 9A:
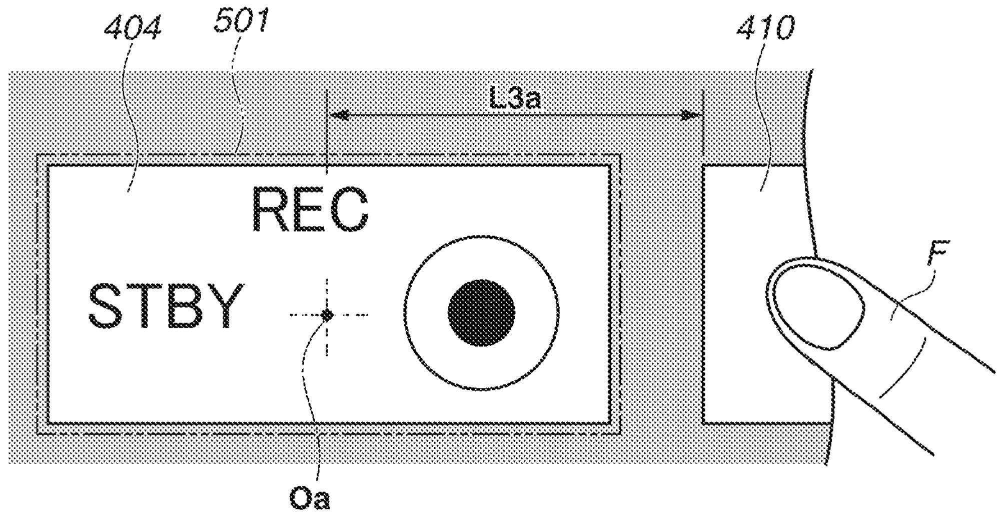
FIGS. 9A and 9B are diagrams each illustrating a region according to a fourth exemplary embodiment in which a touch operation on an operation button is to be received.
Figure 9B:
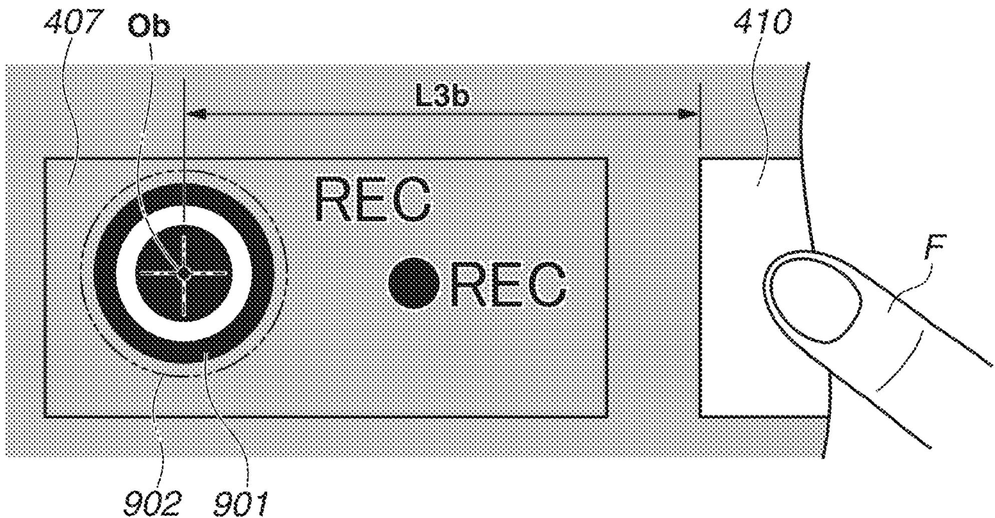

FIGS. 9A and 9B are diagrams illustrating regions according to a fourth exemplary embodiment in which touch operations on the operation button 404 and an operation button 901 are to be received.

FIG. 9A is a diagram illustrating a region in which a touch operation on the operation button 404 is to be received. The operation button 410 is displayed adjacently to the operation button 404. The same components as the components described with reference to FIG. 4A are assigned the same reference numerals, and the description will be appropriately omitted.

The region in which a touch operation on the operation button 404 is to be received is the touch region 501 (first region). The center Oa of the touch region 501 is positioned at a distance L3*a* from the outline of the operation button 410 adjacent to the touch region 501.

FIG. 9B is a diagram illustrating a region in which a touch operation on the operation button 901 is to be received. The same components as the components described with reference to FIG. 4B are assigned the same reference numerals, and the description will be appropriately omitted.

The region in which a touch operation on the operation button 901 is to be received is a touch region 902 (second region). A center Ob of the touch region 902 is positioned at a distance L3*b* from the outline of the operation button 410 adjacent to the touch region 902.

The touch region 501 in FIG. 9A and the touch region 902 in FIG. 9B will be compared. The distance L3*b* from the outline of the adjacent operation button 410 to the center Ob of the touch region 902 is longer than the distance L3*a* from the outline of the adjacent operation button 410 to the center Oa of the touch region 501. By positioning the touch region 902 in this manner, the user can avoid unintentionally performing a touch operation on the touch region 902 with the finger F when performing a touch operation on the adjacent operation button 410.

Other Exemplary Embodiments

The present invention can also be realized by processing of supplying a program implementing one or more functions of the above-described exemplary embodiments, to a system or an apparatus via a network or a recording medium, and one or more processors in a computer of the system or the apparatus reading out and executing the program. The present invention can also be realized by a circuit (for example, an application specific integrated circuit (ASIC)) that implements one or more functions.

Heretofore, the exemplary embodiments of the present invention have been described in detail, but the present invention is not limited to these specific exemplary embodiments, and various configurations are also included in the present invention as defined by the appended claims. The above-described exemplary embodiments may be partially combined as needed.

In the above-described exemplary embodiments, the description has been given of the case where the smartphone 200 transmits an instruction to start the recording of a moving image and an instruction to stop the recording, via the connection unit 211 in accordance with the camera control application, but the case is not limited to this case. For example, the present invention may also be applied to a case where, when the imaging unit 202 of the smartphone 200 performs the image capturing of a moving image, and records the moving image onto the recording medium 210 of the smartphone 200, the user performs a touch operation on the display unit 206.

In the above-described exemplary embodiments, the description has been given of the case where an image to be captured by the camera 100 is a moving image, but the case is not limited to this case. For example, an image to be captured by the camera 100 may be a panoramic image, or a still image to be consecutively captured. More specifically, in a case where the camera 100 receives an instruction to start the recording of an image, from the smartphone 200, the camera 100 starts the recording of a panoramic image, or a still image to be consecutively captured. In a case where the camera 100 receives an instruction to stop the recording of an image, from the smartphone 200, the camera 100 stops the recording of a panoramic image, or a still image to be consecutively captured.

The disclosure of the present exemplary embodiment includes configurations, a method, a program, and a recording medium to be described below.

Configuration 1

An image capturing control apparatus including:

a touch detection unit configured to detect a touch operation on a display unit; and a control unit configured to control recording of an image captured by an imaging unit, and a stop of the recording in accordance with a touch operation detected by the touch detection unit, in which, in a case where recording of an image captured by the imaging unit is not being performed, the control unit controls recording of an image captured by the imaging unit, to be started in accordance with a touch operation on a first region in the display unit, and in which, in a case where recording of an image captured by the imaging unit is being performed, the control unit controls recording of an image captured by the imaging unit, to be stopped in accordance with a touch operation on a second region included in the first region.

Configuration 2

The image capturing control apparatus according to Configuration 1, in which, in a case where recording of an image captured by the imaging unit is being performed, in a case where a touch operation is performed at a position that is included in the first region and exists outside the second region, the control unit controls recording of an image captured by the imaging unit, to be continued.

Configuration 3

The image capturing control apparatus according to Configuration 1 or 2, further including a display control unit configured to control display on the display unit, in which the display control unit displays a first operation unit corresponding to the first region, and changes a display mode of the first operation unit between a case where recording of an image captured by the imaging unit is not being performed and a case where recording of an image is being performed.

Configuration 4

The image capturing control apparatus according to Configuration 3, in which the display control unit changes at least one of a shape, a color, and a line width of the first operation unit between a case where recording of an image captured by the imaging unit is not being performed and a case where recording of an image is being performed.

Configuration 5

The image capturing control apparatus according to Configuration 3 or 4, in which, in a case where recording of an image captured by the imaging unit is being performed, the display control unit changes a display mode of the first operation unit in such a manner as to indicate to a user that a touch operation on the first operation unit is disabled.

Configuration 6

The image capturing control apparatus according to any one of Configurations 3 to 5, in which, in a case where recording of an image captured by the imaging unit is being performed, the display control unit changes a display mode of the first operation unit in such a manner as not to display the first operation unit.

Configuration 7

The image capturing control apparatus according to Configuration 1 or 2, further including a display control unit configured to control display on the display unit, in which the display control unit displays a second operation unit corresponding to the second region, and changes a display mode of the second operation unit between a case where recording of an image captured by the imaging unit is not being performed and a case where recording of an image is being performed.

Configuration 8

The image capturing control apparatus according to Configuration 7, in which the display control unit changes at least one of a shape, a color, and a line width of the second operation unit between a case where recording of an image captured by the imaging unit is not being performed and a case where recording of an image is being performed.

Configuration 9

The image capturing control apparatus according to any one of Configurations 1 to 8, in which a position of a center of the first region and a position of a center of the second region are different.

Configuration 10

The image capturing control apparatus according to Configuration 9, in which a distance from an end of a touch reception region in which a touch operation on the display unit can be received, to the center of the second region is longer than a distance from the end of the touch reception region to the center of the first region.

Configuration 11

The image capturing control apparatus according to Configuration 9 or 10, in which a distance from an outline of a third operation unit displayed adjacently to the first region, to the center of the second region is longer than a distance from the outline of the third operation unit to the center of the first region.

Configuration 12

The image capturing control apparatus according to any one of Configurations 1 to 8, in which a position of a center of the first region and a position of a center of the second region are the same.

Configuration 13

The image capturing control apparatus according to Configuration 12, in which a distance from the center of the first region to an outline of the first region is longer than a distance from the center of the second region to an outline of the second region.

Configuration 14

The image capturing control apparatus according to any one of Configurations 1 to 13, further including a communication unit configured to communicate with the imaging unit, in which an image and information regarding the imaging unit that have been received from the imaging unit via the communication unit are displayed on the display unit.

Configuration 15

The image capturing control apparatus according to any one of Configurations 1 to 14, in which an image to be captured by the imaging unit is any image of a moving image, a panoramic image, and a still image to be consecutively captured.

Method 1

A control method of an image capturing control apparatus, the control method including:

detecting a touch operation on a display unit; and controlling recording of an image captured by an imaging unit, and a stop of the recording in accordance with a touch operation detected by the detecting, in which, in a case where recording of an image captured by the imaging unit is not being performed, the controlling controls recording of an image captured by the imaging unit, to be started in accordance with a touch operation on a first region in the display unit, and in which, in a case where recording of an image captured by the imaging unit is being performed, the controlling controls recording of an image captured by the imaging unit, to be stopped in accordance with a touch operation on a second region included in the first region.

Program 1

A program for causing a computer to function as the control unit of the image capturing control apparatus according to any one of Configurations 1 to 15.

Recording Medium 1

A computer-readable recording medium storing a program for causing a computer to function as the control unit of the image capturing control apparatus any one of Configurations 1 to 15.

According to the present invention, it is possible to prevent the recording of an image from being stopped by an unintentional touch operation.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all equivalent structures and functions.

This application claims the benefit of Japanese Patent Application No. 2023-102458, filed Jun. 22, 2023, which is hereby incorporated by reference herein in its entirety.

What is claimed is:

1. An image capturing control apparatus comprising:

one or more processors; and a memory storing instructions which, when executed by the one or more processors, cause the image capturing control apparatus to function as:

a touch detection unit configured to detect a touch operation on a display unit; and a control unit configured to control recording of an image captured by an imaging unit, and a stop of the recording in accordance with a touch operation detected by the touch detection unit, wherein, in a case where recording of an image captured by the imaging unit is not being performed, the control unit controls recording of an image captured by the imaging unit, to be started in accordance with a touch operation on a first region in the display unit, wherein, in a case where recording of an image captured by the imaging unit is being performed, the control unit controls recording of an image captured by the imaging unit, to be stopped in accordance with a touch operation on a second region included in the first region, wherein a position of a center of the first region and a position of a center of the second region are different, and wherein (i) a distance from an end of a touch reception region in which a touch operation on the display unit can be received, to the center of the second region is longer than a distance from the end of the touch reception region to the center of the first region or (ii) a distance from an outline of a third operation unit displayed adjacently to the first region, to the center of the second region is longer than a distance from the outline of the third operation unit to the center of the first region.

2. The image capturing control apparatus according to claim 1, wherein, in a case where recording of an image captured by the imaging unit is being performed, in a case where a touch operation is performed at a position that is included in the first region and exists outside the second region, the control unit controls recording of an image captured by the imaging unit, to be continued.

3. The image capturing control apparatus according to claim 1, further comprising a display control unit configured to control display on the display unit, wherein the display control unit displays a first operation unit corresponding to the first region, and changes a display mode of the first operation unit depending on whether recording of an image captured by the imaging unit is being performed or not being performed.

4. The image capturing control apparatus according to claim 3, wherein the display control unit changes at least one of a shape, a color, and a line width of the first operation unit depending on whether recording of an image captured by the imaging unit is being performed or not being performed.

5. The image capturing control apparatus according to claim 3, wherein, in a case where recording of an image captured by the imaging unit is being performed, the display control unit changes a display mode of the first operation unit in such a manner as to indicate to a user that a touch operation on the first operation unit is disabled.

6. The image capturing control apparatus according to claim 3, wherein, in a case where recording of an image captured by the imaging unit is being performed, the display control unit changes a display mode of the first operation unit in such a manner as not to display the first operation unit.

7. The image capturing control apparatus according to claim 1, further comprising a display control unit configured to control display on the display unit, wherein the display control unit displays a second operation unit corresponding to the second region, and changes a display mode of the second operation unit depending on whether recording of an image captured by the imaging unit is being performed or not being performed.

8. The image capturing control apparatus according to claim 7, wherein the display control unit changes at least one of a shape, a color, and a line width of the second operation unit depending on whether a case where recording of an image captured by the imaging unit is being performed or not being performed.

9. The image capturing control apparatus according to claim 1, wherein a position of a center of the first region and a position of a center of the second region are the same.

10. The image capturing control apparatus according to claim 9, wherein a distance from the center of the first region to an outline of the first region is longer than a distance from the center of the second region to an outline of the second region.

11. The image capturing control apparatus according to claim 1, further comprising a communication unit configured to communicate with the imaging unit, wherein an image and information regarding the imaging unit that have been received from the imaging unit via the communication unit are displayed on the display unit.

12. The image capturing control apparatus according to claim 1, wherein an image to be captured by the imaging unit is any image of a moving image, a panoramic image, and a still image to be consecutively captured.

13. A control method of an image capturing control apparatus, the control method comprising:

detecting a touch operation on a display unit; and controlling recording of an image captured by an imaging unit, and a stop of the recording in accordance with a touch operation detected by the detecting, wherein, in a case where recording of an image captured by the imaging unit is not being performed, the controlling controls recording of an image captured by the imaging unit, to be started in accordance with a touch operation on a first region in the display unit, wherein, in a case where recording of an image captured by the imaging unit is being performed, the controlling controls recording of an image captured by the imaging unit, to be stopped in accordance with a touch operation on a second region included in the first region, wherein a position of a center of the first region and a position of a center of the second region are different, and wherein (i) a distance from an end of a touch reception region in which a touch operation on the display unit can be received, to the center of the second region is longer than a distance from the end of the touch reception region to the center of the first region or (ii) a distance from an outline of a third operation unit displayed adjacently to the first region, to the center of the second region is longer than a distance from the outline of the third operation unit to the center of the first region.

14. A non-transitory computer-readable recording medium storing a program for causing a computer to function as a control unit of an image capturing control apparatus, the program comprising:

detecting a touch operation on a display unit; and controlling recording of an image captured by an imaging unit, and a stop of the recording in accordance with a touch operation detected by the detecting, wherein, in a case where recording of an image captured by the imaging unit is not being performed, the controlling controls recording of an image captured by the imaging unit, to be started in accordance with a touch operation on a first region in the display unit, wherein, in a case where recording of an image captured by the imaging unit is being performed, the controlling controls recording of an image captured by the imaging unit, to be stopped in accordance with a touch operation on a second region included in the first region, wherein a position of a center of the first region and a position of a center of the second region are different, and wherein (i) a distance from an end of a touch reception region in which a touch operation on the display unit can be received, to the center of the second region is longer than a distance from the end of the touch reception region to the center of the first region or (ii) a distance from an outline of a third operation unit displayed adjacently to the first region, to the center of the second region is longer than a distance from the outline of the third operation unit to the center of the first region.

* * * * *